(12) United States Patent
Boudjouk et al.

(10) Patent No.: US 7,544,722 B2
(45) Date of Patent: Jun. 9, 2009

(54) POLYMERIC MATERIALS WITH ANTI-FOULING ACTIVITY

(75) Inventors: Philip Boudjouk, Fargo, ND (US);
Johnson Thomas, Fargo, ND (US);
Seok-Bong Choi, Fargo, ND (US);
Thomas E. Ready, Page, ND (US)

(73) Assignee: NDSU Research Foundation, Fargo, ND (US)

( * ) Notice: Subject to any disclaimer, the term of this patent is extended or adjusted under 35 U.S.C. 154(b) by 302 days.

(21) Appl. No.: 11/276,950

(22) Filed: Mar. 17, 2006

(65) Prior Publication Data

US 2007/0021529 A1 Jan. 25, 2007

Related U.S. Application Data

(63) Continuation of application No. PCT/US2004/031140, filed on Sep. 23, 2004.

(60) Provisional application No. 60/506,077, filed on Sep. 25, 2003, provisional application No. 60/580,834, filed on Jun. 18, 2004.

(51) Int. Cl.
C08G 77/04 (2006.01)
C08G 77/14 (2006.01)
C08G 77/20 (2006.01)
C08G 77/22 (2006.01)

(52) U.S. Cl. ............................ 523/122; 528/25; 528/26; 528/27; 528/28

(58) Field of Classification Search ................. 523/122; 528/25, 26, 27, 28
See application file for complete search history.

(56) References Cited

U.S. PATENT DOCUMENTS

| | | | |
|---|---|---|---|
| 6,413,446 B1 | 7/2002 | Mechtel et al. | |
| 6,458,878 B1 * | 10/2002 | Tsuboi et al. | 524/432 |
| 2002/0098214 A1 | 7/2002 | Adams et al. | |
| 2007/0042199 A1 | 2/2007 | Chisholm et al. | |

OTHER PUBLICATIONS

Isquith, A.J. et al. "Surface-Bonded Antimicrobial Activity of an Organosilicon Quaternary Ammonium Chloride." *Applied Microbiology*, Dec. 1972, p. 859-863, (1973).
Sauvet, G. et al. "Biocidal Polymers active by Contact. V. synthesis of Polysiloxanes with Biocidal Activity." *Journal of Applied Polymer Science*, vol. 75, p. 1005-1012 (2000).
Tiller, J.C. et al. "Designing surfaces that kill bacteria on contact." *PNAS*, vol. 98, No. 11, p. 5981-5985 (2001).
Hazziza-Laskar, J. et al. "Biocidal Polymers Active by Contact. IV. Polyurethanes Based on Polysiloxanes with Pendant Primary Alcohols and Quaternary Ammonium Groups." *Journal of Applied Polymer Science*, vol. 58, p. 77-84 (1995).
Kawabata, N. et al. "Removal of Bacteria from Water by Adhesion to Cross-Linked Poly(Vinylpyridinium Halide)." *Journal of Applied and Environmental Microbiology*, vol. 46, No. 1, pp. 203-210 (1983).
Japanese Patent Abstract for Japanese Publication No. JP 2003-327912, "Primer Antifouling Coating Material Composition for Ship, Composite Antifouling Coating Film for Ship, Method for Forming the Composite Antifouliing Coating Film, Ship Coated with the Composite Antifouliing Coating Film and Antifouling Method for Outer Hull of Ship", date of publication Nov. 19, 2003.
Japanese Patent Abstract for Japanese Publication No. JP 63-270738, "Polyamine/Polysiloxane Block Copolymer", date of publication Nov. 8, 1988.
Japanese Patent Abstract for Japanese Publication No. JP 53-139653, "Marine Antifouling Material", date of publication Dec. 6, 1978.
International Search Report for International Application No. PCT/US04/31140, mail date Aug. 16, 2005, 2 pages.
Supplementary European Search Report for Application No. EP 04784830, mail date Oct. 30, 2007, 3 pages.
Clouet et al., "Macrothiuram Disulfide for the Free Radical Synthesis of PDMS-Vinyl Triblock Copolymers. I. Syntheses and Polymerization Kinetics", Journal of Polymer Science: Part A: Polymer Chemistry, vol. 31, 1993, pp. 3387-3396.
Pike et al., "Water-Induced Surface Rearrangements of Poly(dimethylsiloxane-urea-urethane) Segmented Block Copolymers", vol. 8, No. 1, Jan. 1996, 7 pages.
Kawakami et al. "Silicone Macromers for Graft Polymer Synthesis", Polymer Journal, vol. 14. No. 11, 1982, pp. 913-917.
Holohan et al. "Monofunctional polydimethylsiloxane oligomers for graft copolymerization", Department of Chemistry, Imperial College of Science Technology and Medicine, 1994, 8 pages.
Abstract for Japanese Publication No. 04-370163, "Coating Composition", date of publication Dec. 22, 1992 (1 page).
Abstract for Japanese Publication No. 63-277222, "Curing Resin", date of publication Nov. 15, 1988 (1 page).

* cited by examiner

*Primary Examiner*—Kriellion A Sanders
(74) *Attorney, Agent, or Firm*—Foley & Lardner LLP (57) ABSTRACT

An anti-fouling material useful to prevent fouling of structure exposed to a water environment includes a copolymer having a carbon and/or silicone backbone with a pendant biocidal group and, optionally, a pendant fouling release group.

20 Claims, 10 Drawing Sheets

Characterization of the Block Polymer

POLYMERIC MATERIALS WITH ANTI-FOULING ACTIVITY

CROSS-REFERENCE TO RELATED PATENT APPLICATIONS

This application is a continuation of International Patent Application PCT/US04/31140, entitled "Antifouling Materials," filed on Sep. 23, 2004, which claims priority to U.S. Provisional Patent Application Ser. No. 60/506,077, entitled "Antifouling Materials," filed on Sep. 25, 2003 and U.S. Provisional Patent Application Ser. No. 60/580,834, entitled "Anti-fouling Materials," filed on Jun. 18, 2004; all of which are hereby expressly incorporated by reference herein in their entireties.

GOVERNMENT RIGHTS

The U.S. Government may have certain rights in this invention including the right in limited circumstances to require the patent owner to license others on reasonable terms as provided for by the terms of Grant Nos. N00014-02-1-0794 and/or N00014-03-1-0702 awarded by the Department of Defense Office of Naval Research.

BACKGROUND

Fouling of surfaces exposed to an aquatic environment is a serious problem. For example, surfaces of ships such as the hull, offshore marine structures such as oil rigs, sea water conduit systems for seaside plants, buoys, heat-exchangers, cooling towers, de-salination equipment, filtration membranes, docks, and the like may all experience some degree of fouling when continually exposed to water. In the case of ships, fouling can inhibit vessel performance and capabilities. For example, fouling may substantially increase fuel consumption and may necessitate extensive and more frequent maintenance, all of which raise the overall costs of operation. Fouling may also reduce ship speed, maneuverability, and range, which impede performance. On another level, attachment of regionally specific aquatic organisms on ships that traverse the world can lead to the unwanted invasion and infestation of these organisms to non-indigenous harbors. In some instances, this can have severe adverse effects on local aquatic ecosystems.

Over the years there have been numerous attempts to minimize the effect of fouling on structures exposed to an aquatic environment. For example, coatings (e.g., paints, etc.) have been developed that impede the attachment and/or growth of aquatic organisms on such structures. Certain materials which may be used to form such a coating are described in U.S. Provisional Patent Application Ser. No. 60/506,077. Traditionally, two parallel lines of coatings research and development aimed at reducing fouling have predominated: biocide containing coatings and low surface energy, "non-stick," fouling release coatings. Each of these approaches has produced elements of success but continue to have problems.

Unfortunately, certain biocidal coatings have been linked to environmental problems (e.g., tin based biocidal coatings, etc.). For example, while moored in harbors, paint chips and leaching have led to sediment accumulations of toxins resulting in harm or destruction of non-targeted sea life (e.g., oysters). Accordingly, the development of an effective alternative to these biocidal coatings would be desirable.

SUMMARY

A number of compounds suitable for use as or in anti-fouling materials are disclosed herein. In general, anti-fouling materials refer to products, agents, or compositions which may provide biocidal and/or fouling release properties when used alone or in combination with other materials or substances. The anti-fouling materials described herein may include one or more of a number of suitable copolymers (e.g., block copolymers, graft copolymers, etc.) which provide biocidal and/or fouling release characteristics. Examples of suitable polymeric materials which can be used to form biocidal coatings are depicted in FIGS. 1-2, 4, 7, and 10-16 herein. In one embodiment, the copolymer includes one or more rubbery polymer sequences having a carbon and/or silicone backbone combined with one or more polymer sequences which include one or more biocidal groups. The copolymer may also include one or more polymer sequences which enhance the texture or fouling release properties of the copolymer and/or the final product which incorporates the copolymer. It may also be desirable to include functional groups which are capable of serving as sites for cross-linking reactions in the copolymer. The copolymers may have a molecular weight from 5,000 to 100,000, or, desirably, 10,000 to 75,000, or, suitably, 10,000 to 50,000. Quite commonly, the copolymers include two or more blocks wherein each block contains about 10 to 100 subunits.

In one embodiment, an anti-fouling material comprises the following copolymer:

wherein m may be an integer from 0 to 100, 0 to 65, 10 to 75, or more desirably 20 to 50;

n may be an integer from 0 to 100, 0 to 65, 10 to 75, or more desirably 20 to 50;

at least one of m and n≠0;

In is an initiator group;

EC is an end cap group;

x may be an integer from 1 to 200, 10 to 150, 25 to 100, or more desirably 35 to 75;

p may be an integer from 0 to 75, 0 to 50, 10 to 50, 10 to 25, or more desirably 20 to 50;

$R^1$ may be a hydrogen, methyl group, or other alkyl group (e.g., lower alkyl group);

$R^2$ and $R^3$ may be independently a cross-linking group, $C_1$-$C_{10}$ alkyl, cyclopentyl, cyclohexyl, benzyl, toluyl, xylyl, phenyl, or any one of a number of biocidal functional groups;

$L^1$ may be a linking group;

$R^4$ may be a biocidal group that is toxic to organisms that cause fouling in an aquatic environment or a group that can be cleaved off (i.e., via hydrolysis) to form such a biocidal group;

$R^5$ may be a fouling release group, an alkyl group, or other texturizing group; and $R^x$ is an H or Me.

In another embodiment, shown below, an anti-fouling material comprises the following copolymer:

wherein m may be an integer from 0 to 100, 0 to 65, or more desirably 0 to 50;

n may be an integer from 1 to 100, 0 to 65, or more desirably 20 to 50;

x may be an integer from 1 to 200, 1 to 150, or more desirably 1 to 100;

y may be an integer from 1 to 100, 10-75, or more desirably 20 to 50;

In is an initiator group;

EC is an end cap group;

$R^1$ is a hydrogen or lower alkyl group (e.g., a methyl group);

$R^2$ is a cross-linking group, $C_1$-$C_{10}$ alkyl, cyclopentyl, cyclohexyl, benzyl, toluyl, xylyl, or phenyl;

$L^1$ is a linking group;

$R^3$ is a biocidal group that is toxic to organisms that cause fouling in an aquatic environment or a group that can be cleaved off (i.e., via hydrolysis) to provide such a biocidal group;

$R^4$ and $R^5$ may be independently a cross-linking group, $C_1$-$C_{10}$ alkyl, cyclopentyl, cyclohexyl, benzyl, toluyl, xylyl, phenyl, or any one of a number of biocidal functional groups; and $R^x$ is an H or Me.

In another embodiment, a biocidal composition may comprise a graft copolymer having a formula:

wherein m may be an integer from 0 to 100, 10 to 75, or more desirably 20 to 50;

y may be an integer from 1 to 100, 10 to 75, or more desirably 20 to 50;

x may be an integer from 1 to 200, 10 to 150, 25 to 100, or more desirably 35 to 75;

In may be an initiator group;

$R^1$ may be a hydrogen or methyl group;

$R^2$ may be a cross-linking group, $C_1$-$C_{10}$ alkyl, cyclopentyl, cyclohexyl, benzyl, toluyl, xylyl, or phenyl;

$L^1$ may be a linking group;

$R^4$ may be a biocidal group that is toxic to organisms that cause fouling in an aquatic environment or a group that can be cleaved to provide a biocidal group;

$R^x$ is an H or Me; and

EC may be an end cap group.

A biocidal composition comprising a block copolymer having a formula:

wherein m may be an integer from 1 to 100, 10 to 75, or more desirably 20 to 50;

x may be an integer from 1 to 200, 10 to 150, 25 to 100, or more desirably 35 to 75;

p may be an integer from 0 to 75, 10 to 50, or more desirably 20 to 50;

In may be an initiator group;

$R^1$ may be a hydrogen or methyl group;

$L^1$ may be a linking group;

$R^2$ may be a biocidal group that is toxic to organisms that cause fouling in an aquatic environment or a group that can be cleaved to provide a biocidal group;

$R^3$ may be a fouling release group, an alkyl group, or other texturizing group;

$R^x$ is an H or Me; and

EC may be an end cap group.

In another embodiment, a biocidal composition may comprise a block copolymer having a formula:

wherein n may be an integer from 1 to 100, 10 to 75, or more desirably 20 to 50;

x may be an integer from 1 to 200, 10 to 150, 25 to 100, or more desirably 35 to 75;

p may be an integer from 0 to 75, 10 to 50, or more desirably 20 to 50;

In may be an initiator group;

$L^1$ may be a linking group;

$R^1$ and $R^2$ may be independently a cross-linking group, $C_1$-$C_{10}$ alkyl, cyclopentyl, cyclohexyl, benzyl, toluyl, xylyl, or phenyl;

$R^3$ may be a biocidal group that is toxic to organisms that cause fouling in an aquatic environment or a group that can be cleaved to provide a biocidal group;

$R^4$ may be a fouling release group, an alkyl group, or other texturizing group;

$R^x$ is an H or Me; and

EC may be an end cap group.

In another embodiment, a biocidal composition may comprise a structure having the formula:

wherein m may be integer between 1 to 15 or more desirably 4 to 10;

n may be an integer between 2 to 50, 5 to 25, or more desirably 10 to 16;

p may be an integer between 0 to 10 or more desirably 2 to 4;

x may be an integer between 5 to 25 or more desirably 10 to 15;

y may be an integer between 0 to 20 or more desirably 3 to 11; and q may be an integer between 2 to 15, 2 to 10, or more desirably 2 to 5.

As used herein, the term "cross-linking group" refers to a substituent which includes a functional group capable of reacting with another chemical moiety to cross link the polymer. As used herein the term "initiator group" ("In") refers to a substituent added to a terminus of the copolymer as a result of a reaction employed to initiate polymerization. As used herein, the term "end cap group" ("EC") refers to a substituent added to a terminus of the copolymer as a result of a reaction which terminates polymerization. The initiator group ("In") and/or end cap group may include functional groups which alter or influence the physical/chemical properties and character of the copolymer. In most instances, however, the initiator and end cap groups are chosen such that they do not have any significant effect on the overall physical characteristics of the copolymer (e.g., result in the introduction of a hydrogen atom, lower alkyl group or trimethyl silyl group).

DETAILED DESCRIPTION

Generally, the anti-fouling materials described herein comprise a copolymer which includes a number of block sequences which provide the copolymer with biocidal and/or fouling release activity. The various embodiments of anti-fouling materials may be used independently (e.g., as a single coating layer) or in combination with other materials (e.g., paint pigment, etc.) to decrease the amount of fouling experienced by structures and other surfaces exposed to an aquatic environment (e.g., marine environments, freshwater environments, etc.). In many situations, the composition of a coating material which includes the anti-fouling material may also include other compounds such as curing agents, crosslink initiators, etc.

Although the subject matter described herein is provided in the context of anti-fouling, it should be understood that the concepts and features described herein may be used in a variety of materials, settings, and/or situations as would be recognized by those of ordinary skill in the art. Also, it should be understood, that the features, advantages, characteristics, etc. of one embodiment may be applied to any other embodiment to form an additional embodiment unless noted otherwise.

One characteristic of many copolymers is the strong repulsion between different polymer sequences. When the repulsion is sufficiently strong, microphase separation can occur. This characteristic of some copolymers may be utilized to strengthen anti-fouling materials and products which incorporate anti-fouling materials. In one embodiment, microphase separation of the copolymer (e.g., block copolymer, graft copolymer, etc.) may be used to provide increased biocidal activity at the surface of the copolymer due to increased positioning of the biocidal groups at the surface. The degree of microphase separation may be controlled by controlling the amount of the various block polymer sequences in the overall polymer.

Figure 1:
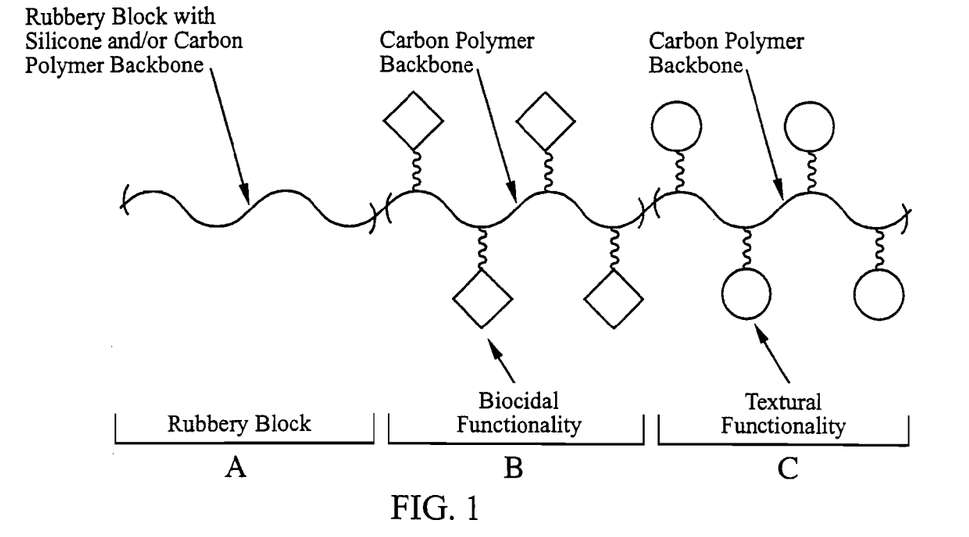
FIG. 1 is a schematic depiction of one embodiment of a block copolymer suitable for use as an anti-fouling material or to form an anti-fouling coating.
Figure 2:
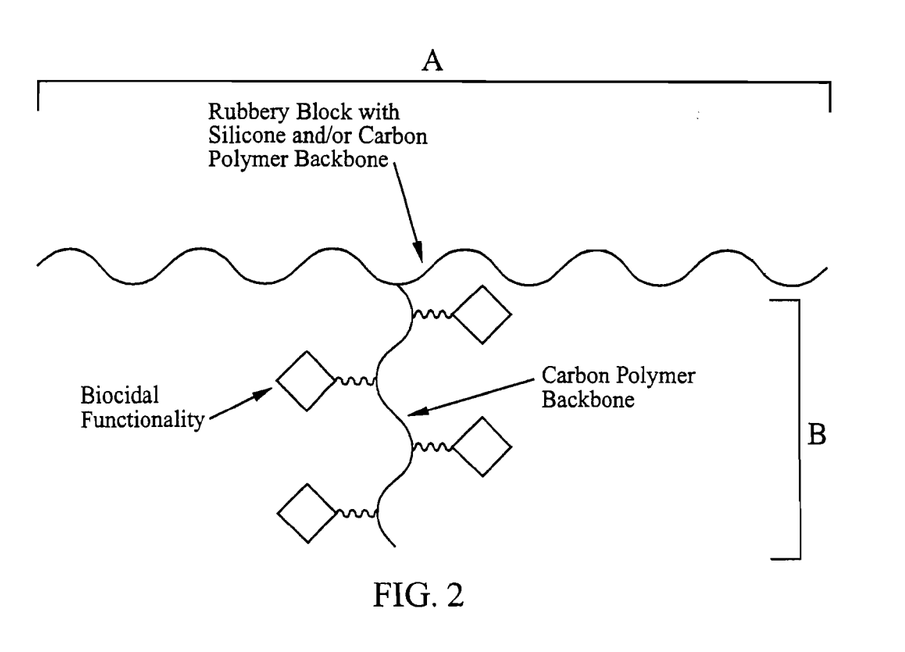
FIG. 2 is a schematic depiction of one embodiment of a graft copolymer suitable for use as an anti-fouling material or to form an anti-fouling coating.
Figure 3:
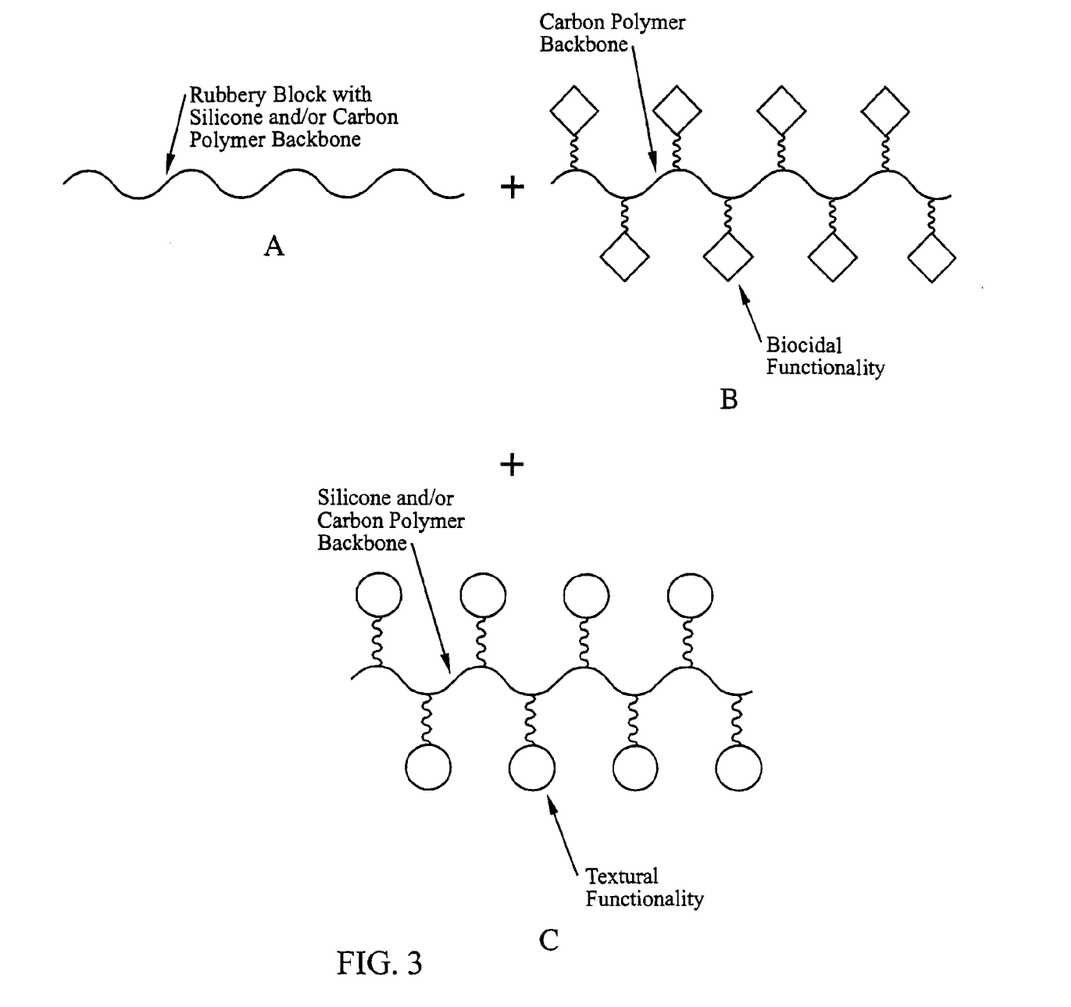
FIG. 3 provides a schematic depiction of a number of oligomers that may be joined to form various embodiments of copolymers which may be used as anti-fouling materials.

FIGS. 1-3 show various embodiments of copolymers that may be used as anti-fouling materials. As shown in FIG. 1, the copolymer may comprise a number of block polymer sequences which may include a biocidal group (e.g., Triclosan, quaternary ammonium, pyridinium, etc.), a fouling release group (e.g., hydrophilic groups such as polyether groups, hydrophobic groups such as perfluroalkyl groups, liquid crystalline groups such as deuterobenzene groups, self-organizing groups, etc.), and the like. In other embodiments, the copolymer may include a polymer sequence which provides fouling release characteristics (e.g., sequence A or sequence C) in combination with a polymer sequence which provides biocidal characteristics. Also, any of the polymer sequences used in the copolymer may also include one or more crosslinking groups (e.g., epoxy, olefin, amine, acid, aldehyde, ester, etc.). It should also be understood that the order of the polymer sequences in FIG. 1 (and in FIG. 11-16) is exemplary only. For example, in FIG. 1, the polymer sequence A may be positioned between sequences B and C, or sequence C may be positioned between sequences A and B, and so on. Each of the blocks depicted may also be present more than one time in the copolymer.

In general, sequence A is a rubbery block which includes a silicone or carbon backbone. Sequence A may be any suitable linear or branched carbon polymer sequence or a polysiloxane. For example, sequence A may be made using isoprene, butadiene, or silicone monomers. In many instances, sequence A does not include any biocide or textural functional groups. Sequence A, however, often contributes to the toughness of the anti-fouling materials (e.g., sequence A may provide additional strength or toughness versus a polysiloxane polymer). In other embodiments, sequence A may include biocidal and/or textural functional groups and may not provide fouling release properties to the resulting copolymer.

Sequence B from FIG. 1 generally includes a carbon polymer backbone and one or more biocidal functional groups. Sequence C typically includes a carbon polymer backbone and one or more textural functional groups (e.g., methoxyethyl methacrylate, etc.) that may be used to enhance the anti-fouling/fouling release characteristics of the copolymer. For example, block sequence C may include dimethyl siloxane, methylhydro siloxane, vinylmethyl siloxane in any combination (e.g., random or in blocks, etc.) as shown in claim 4.

Referring to FIG. 2, a graft copolymer is shown where sequence B and sequence A have been grafted together. Although not shown, sequence C may also be grafted onto sequence A and/or B (or may be linked to a terminus of one of these blocks). In yet further embodiments, sequence A may be grafted onto sequence B, or sequence B grafted onto sequence C, and so on. There are a wide variety of ways in which the polymer sequences can be arranged to form the copolymer. FIG. 3 shows in general terms block sequences which may be combined to form the present copolymer. In one embodiment, the copolymers may be synthesized using a combination of anionic and controlled radical polymerization.

As previously mentioned, the copolymers may be crosslinked. In one embodiment, the crosslinking functionality is provided on sequence A. In another embodiment, the crosslinking functionality may be provided on sequences B and/or C. In another embodiment, the copolymers may be blended (i.e., physically mixed) together. Of course, any of the crosslinked copolymers may be blended with other crosslinked copolymers. In yet another embodiment, the copolymers may be used to form an interpenetrating network. The interpenetrating network can be made by polymerizing one or more monomers around the biocidal copolymer(s), or, in some circumstances, individual polymers used to make the copolymer (i.e., the polymers have not been added to the other polymers to form the copolymer), to form a polymer network which tightly holds the copolymers and/or individual polymers. The crosslinking functionality may be provided using a functional group on a carbon backbone (e.g., vinyl group, etc.), a hydro functionalized siloxane, etc. In one embodiment, the crosslinking moiety is propyl glycidyl ether side group. Likewise, the biocidal group may be any of a number of suitable groups. For example, in one embodiment, the biocidal group is propyl, 2-(2',4'-dichlorophenoxy)-5-chlorophenyl ether.

The copolymers described herein can suppress biological fouling of surfaces exposed to a watery environment by way of the biocidal activity of the biocidal groups, fouling release activity of the polymer sequences, and/or a synergistic combination of both. As used herein, the term "biocidal" used alone or in combination with other terms (e.g., groups, activity, etc.) refers to biocidal activity that is toxic to aquatic organisms that cause fouling. The use of the term "biocidal" does not require the organisms to actually be killed. Rather, "biocidal" also encompasses situations where the activity is sufficient to prevent the organism from attaching to and fouling a surface. In one embodiment, the biocidal functionality are provided using organic biocidal blocks. The use of organic biocidal blocks may be desirable because they are generally easier to use from a chemistry standpoint, and, may also present less governmental regulatory problems than some other types of biocidal blocks (e.g., biocidal groups comprising heaving metals, etc.). In other embodiments, however, the biocidal blocks may include one or more inorganic biocides such as metals, etc (e.g., metal salts of carboxylates).

The toxicity of the biocidal groups coupled to the copolymer may act to impede or suppress the settlement and/or growth of aquatic organisms that would otherwise foul these surfaces. It should be noted that "biological entities" or "organisms," etc., refers to aquatic biological entities or organisms that cause or contribute to fouling in an aquatic environment (e.g., marine environment). Growth may be suppressed when a biological entity is contacted with a copolymer having a biocide block so that the rate of settlement and/or growth of biological entities on the coated surface is less than that of an uncoated surface. When biological entities contact the copolymer, a significant number of the biological entities may be destroyed or, desirably, substantially all or all of the biological entities may be destroyed. Or course, the copolymer may also simply prevent the biological entities from depositing on the coated surface without actually destroying them.

The fouling release activity of the copolymer can act to impede or suppress the adhesion of aquatic organisms to the coated surface and/or facilitate ready release of the organisms from the surface. The copolymers described herein may have sufficiently low surface energy and sufficiently low modulus of elasticity so that application of an external shear stress to biological entities adhered to the copolymers may result in partial or complete removal of those entities. The external shear stress can be provided by moving water (e.g., pressure washer, etc.) or from physical contact with a brush or sand blaster. Examples of aquatic organisms that cause fouling and which the disclosed copolymers may be used to prevent fouling are Enteromorpha spores, Hydroides Elegans (tube worms), bacteria, germs, microbes, biofilms, crustaceans, tube worms, cyprid larvae, grasses, clams, oysters, and/or barnacles, etc.

Compositions or formulations including an effective amount of a biocidal copolymer can be applied as an antifouling coating having biocidal and/or fouling release activity. A surface may be treated by applying a suitable amount of a coating that comprises one or more biocidal copolymers as described herein. In one embodiment, it may be desirable to administer the coating composition in an amount which is effective to suppress the settlement and/or growth of biological entities as well as enable their facile release by the application of an external shear stress. As known to those of skill in the art, depending on the particular type of surface or surface environment, the mode of applying the coating may vary. In some instances, the composition may be applied to a surface using a brush or mechanical sprayer. In other instances the surface may be dipped, submerged, or infused with the coating.

As mentioned previously, the present copolymer compositions may include linear and/or branched functionalized copolymers (e.g., branched copolymer generated via graft polymerization). The average number of functionalized subunits in the functionalized copolymers can vary. For example, linear forms of the functionalized copolymer may include from 20 to about 2,000 subunits and linear forms with 50 to 2000 subunits are quite suitable for coatings applications. Cyclic forms of alkoxy polysiloxane compounds typically include from 3 to about 12 siloxane subunits and cyclic forms with 3 to 6 units are quite suitable for use in forming the present copolymers.

EXAMPLES

Reference is made in the following to a number of illustrative examples of anti-fouling compositions. The following embodiments should be considered as only a sample of numerous compositions which may be used as anti-fouling materials and should not be considered to be limiting in any way.

Example 1

In this example, Polyvinylmethyl siloxane-b-Polydimethyl siloxane-b-Polybiocide (PVMS-b-PDMS-b-Polybio) was synthesized as follows. Dry 1,3,5-trivinyl-1,3,5-trimethyl cyclotrisiloxane (V3) and hexamethyl cyclotrisiloxane (D3) were added to a Schlenk tube under nitrogen purge followed by dry THF. n-BuLi was then added to this mixture and the reaction continued for 6 hours at ambient conditions. The reaction was terminated by chlorodimethyl silane and precipitated into methanol. The solvent was decanted and the polymer dried and was end functionalized using allyl isobutyryl bromide in toluene using Karstedt's catalyst (platinum (0)-1,3-divinyl-1,1,3,3-tetramethyl disiloxane complex). The end functionalized Polyvinylmethyl siloxane-b-Polydimethyl siloxane polymer was added to a Schlenk flask in toluene followed by methacrylate functionalized biocide, Triclosan (i.e., the Triclosan methacrylate ester shown in FIG. 4; "TRICL-MAE"). The catalyst, copper bromide and ligand, N,N,N',N',N"-pentamethyl-diethylenetriamine were added to the flask and subjected to three freeze-thaw pump cycles. After the freeze-thaw pump cycles, the temperature was raised to 90° C. and the polymerization continued for 48 hours. After polymerization, the polymer was recovered by precipitating into methanol and filtration. The polymer was redissolved in toluene and passed through a neutral alumina column to remove the catalyst, precipitated into methanol, filtered and dried.

Figure 4:
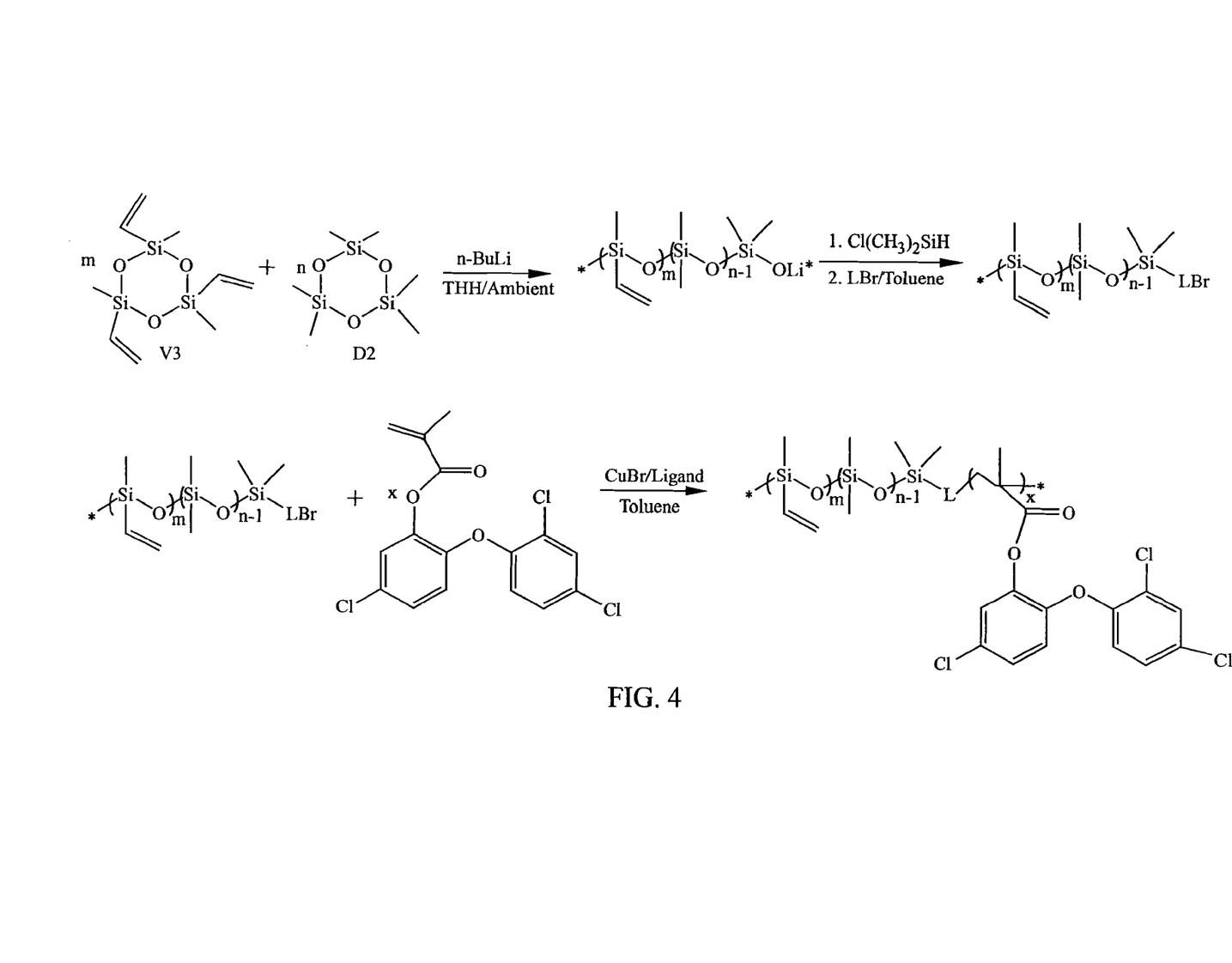
FIG. 4 shows one embodiment of a synthetic strategy for making Polyvinylmethyl siloxane-b-Polydimethyl siloxane-b-Polybiocide (where "biocide" is poly-(TRICL-MAE).
Figure 5A:
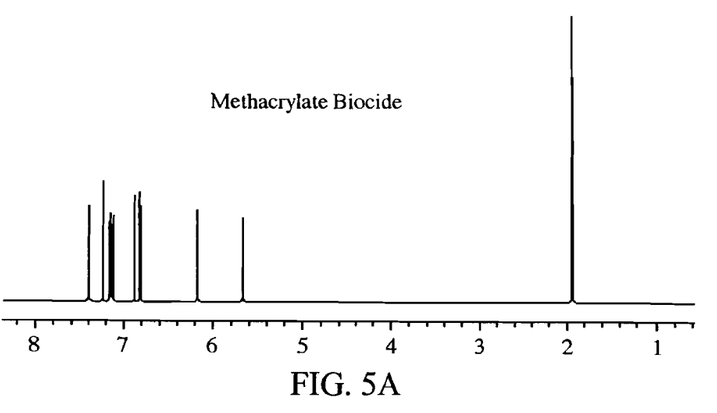
FIG. 5 shows NMR results for TRICL-MAE (5a); PVMS-b-PDMS (5b); and polymeric material prepared as shown in FIG. 4 (5c).
Figure 5B:
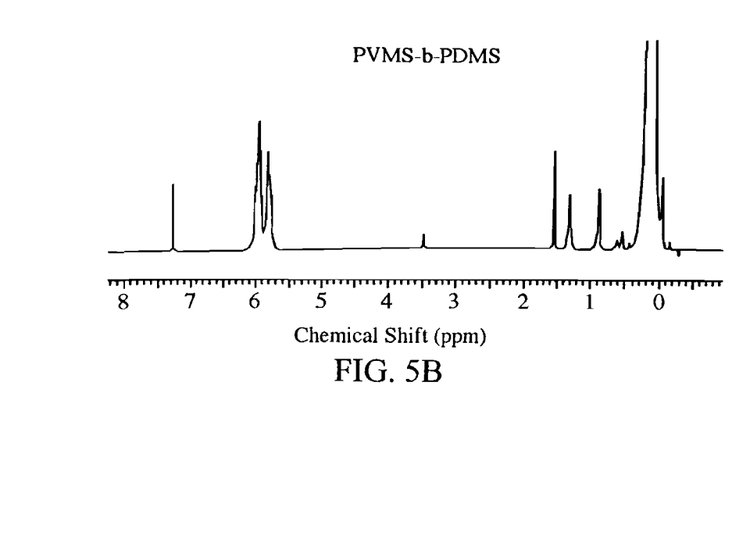
Figure 5C:
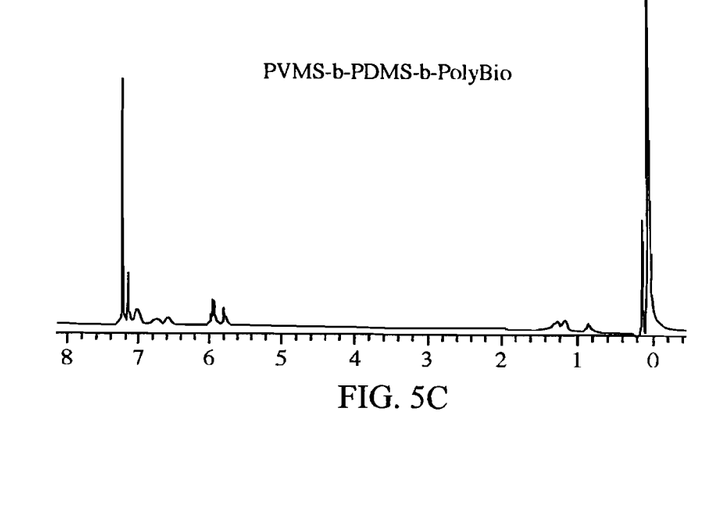
Figure 6:
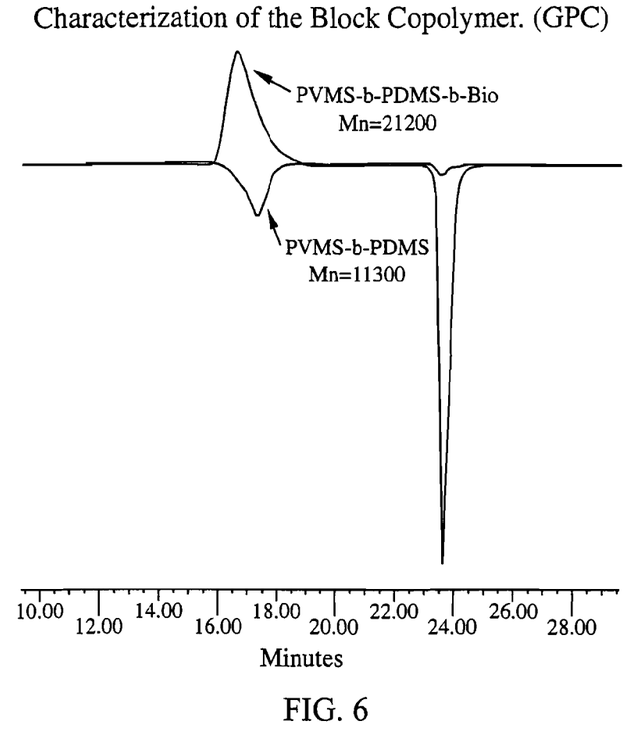
FIG. 6 shows the gel permeation chromatography (GPC) results for the polymeric material prepared as shown in FIG. 4.

FIG. 4 shows the synthetic strategy of Example 1. The structure of the copolymer was confirmed by NMR, as shown in FIG. 5, and the molecular weight was determined by gel permeation chromatography (GPC), as shown in FIG. 6. The ratio of PVMS-b-PDMS to Polybio was about 1:1 to about 1:4.

Example 2

In this example, Polyisoprene-b-Polybiocide (PI-b-Polybiocide; where "Biocide" is Poly -(TRICL-MAE)) was synthesized as follows. Dry isoprene was added to a Schlenk tube under nitrogen purge followed by dry cyclohexane. n-BuLi was then added and the reaction continued for 4 hours at ambient conditions. The reaction was terminated by adding bromo isobutyryl bromide and the polymer was precipitated into methanol. The solvent was decanted and the polymer dried. The end functionalized polyisoprene was added to a Schlenk flask in toluene followed by methacrylate functionalized biocide, Triclosan (TRICL-MAE). The catalyst, copper bromide and ligand, N,N,N',N',N"-pentamethyl-diethylenetriamine were added to the flask and subjected to three freeze-thaw pump cycles. After the freeze-thaw pump cycles, the temperature was raised to 90° C. and the polymerization continued for 48 hours. After polymerization, the polymer was recovered by precipitating into methanol and filtration.

The polymer was redissolved in toluene and passed through a neutral alumina column to remove the catalyst, precipitated into methanol, filtered and dried.

Figure 7:
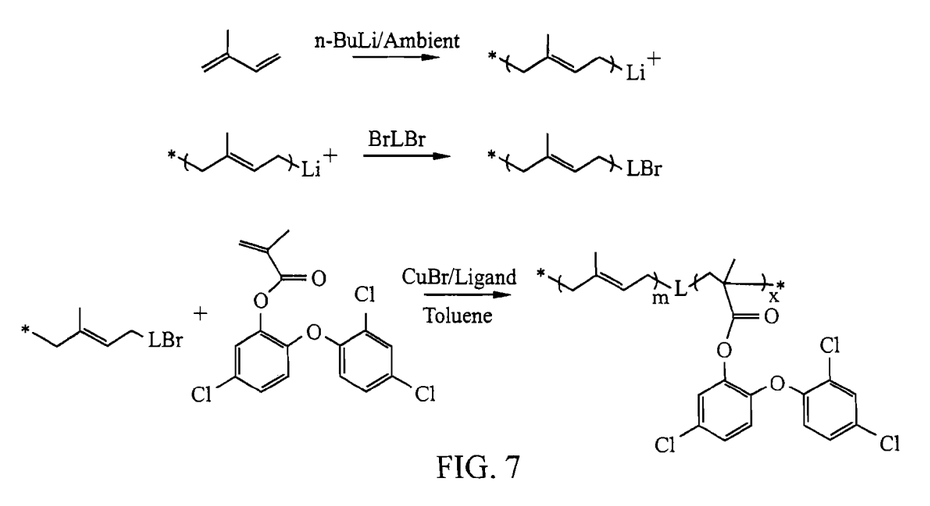
FIG. 7 shows another embodiment of a synthetic strategy for making Polyisoprene-b-Polybiocide.
Figure 8:
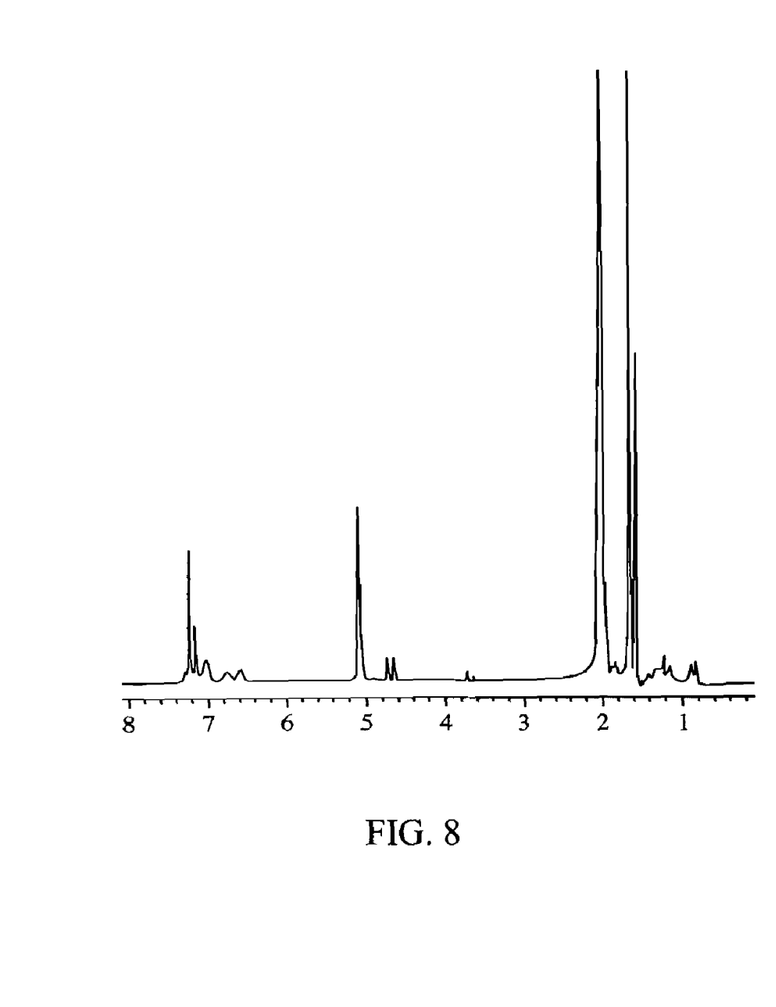
FIG. 8 shows NMR results for the composition prepared as shown in FIG. 7.
Figure 9:
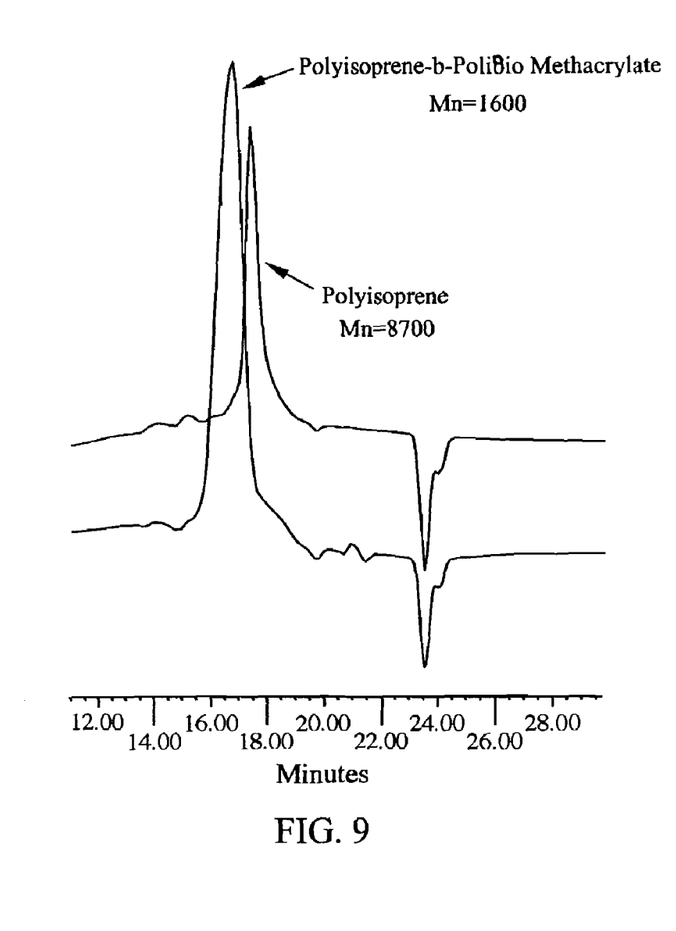
FIG. 9 shows the GPC results for the composition prepared as shown in FIG. 7.

FIG. 7 shows the synthetic strategy of Example 2. The structure of the copolymer was confirmed by NMR, as shown in FIG. 8, and the molecular weight was determined by gel permeation chromatography (GPC), as shown in FIG. 9. The ratio of PI to Polybiocode was about 1:1 to 1:4, or, desirably, 1:1 to 1:3.

Example 3

Figure 10:
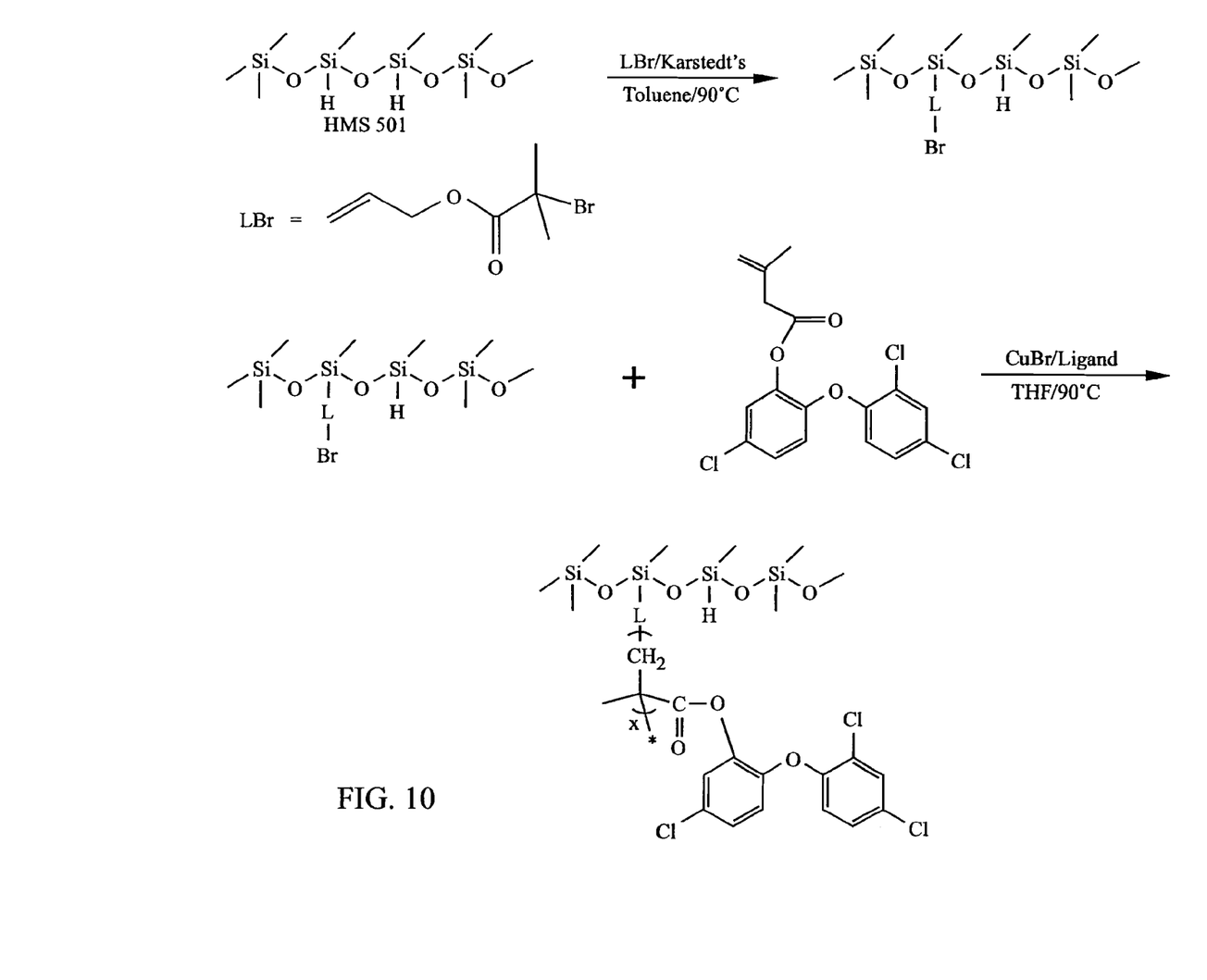
FIG. 10 shows an illustration of a synthetic strategy for making Polymethylhydrosiloxane-co-polydimethylsiloxane-g-Poly-(TRICL-MAE).

In this example, polymethylhydrosiloxane-co-polydimethylsiloxane-g-polymethacrylate biocide was synthesized as follows. Polymethylhydrosiloxane-co-polydimethylsiloxane (HMS501 from Gelest) and allyl isobutyryl bromide were added to dry toluene in a flask under nitrogen and Karstedt's catalyst was added to this mixture. The temperature was raised to 90° C. and the reaction continued for 8 hours. After the reaction, solvent was evaporated and the isobutyryl functionalized HMS 501 was added to a Schlenk tube under nitrogen purge followed by dry THF. The catalyst, copper bromide and ligand, N,N,N',N',N''-pentamethyl-diethylenetriamine were added to the flask and subjected to three freeze-thaw pump cycles. After the freeze-thaw pump cycles, the temperature was raised to 90° C. and the polymerization continued for 48 hours. After polymerization, the polymer was recovered by precipitating into methanol and filtration. The polymer was redissolved in toluene and passed through a neutral alumina column to remove the catalyst, precipitated into methanol, filtered and dried. FIG. 10 shows the synthetic strategy of Example 3.

Figure 11:
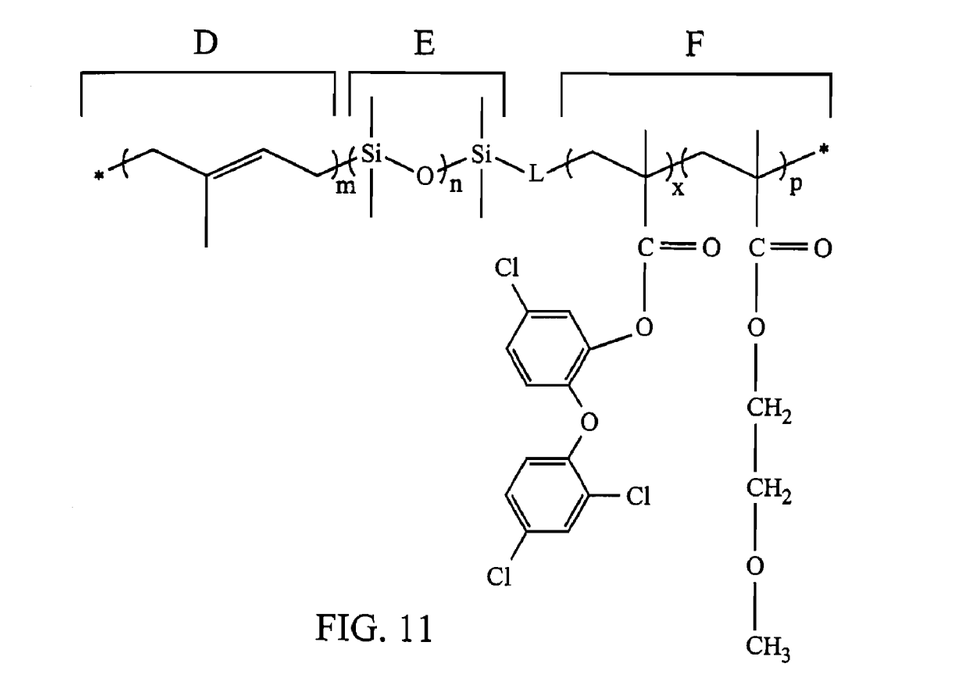
FIGS. 11 shows an illustration of Polyisoprene-b-PDMS-b-Poly-(TRICL-MAE)-co-polymethoxyethyl methacrylate which may be used as an anti-fouling material according to another embodiment.
Figure 12:
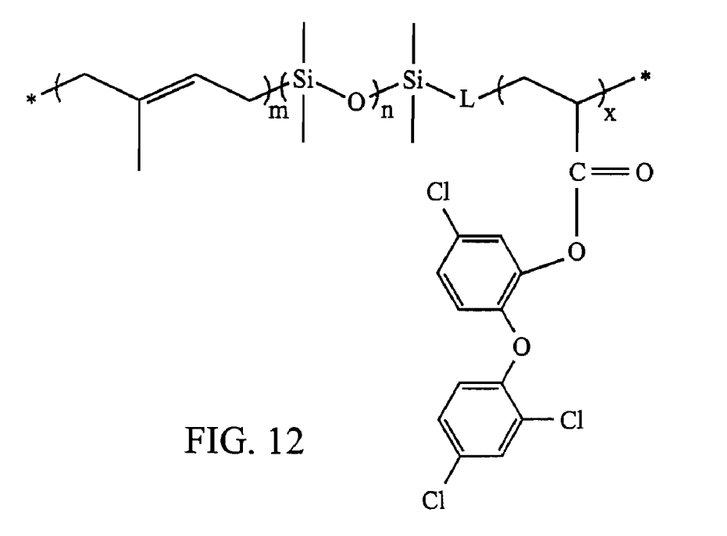
FIG. 12 shows an illustration of Polyisoprene-b-PDMS-b-Poly-(TRICL-MAE) which may be used as an anti-fouling material according to another embodiment.
Figure 13:
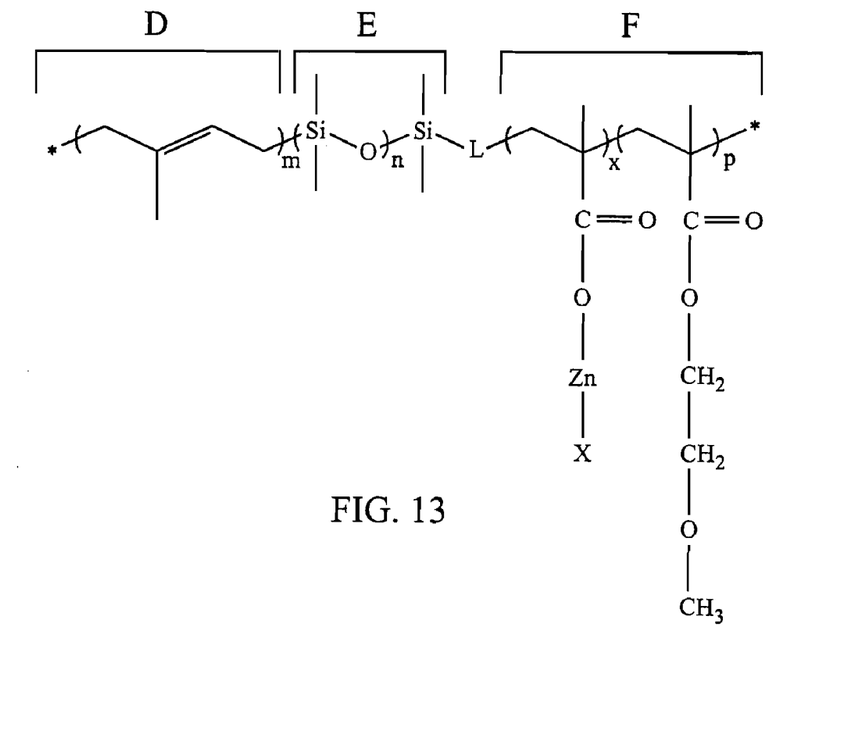
FIG. 13 shows an illustration of Polyisoprene-b-PDMS-b-Poly Zinc acrylate-co-polymethoxyethyl methacrylate which may be used as an anti-fouling material according to another embodiment.
Figure 14:
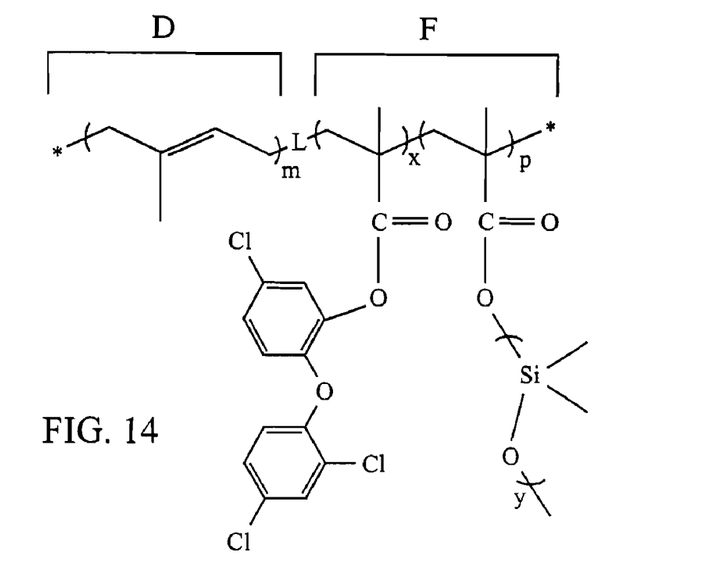
FIG. 14 shows an illustration of Polyisoprene-b-Poly-(TRICL-MAE)-co-polymethacrylate siloxane which may be used as an anti-fouling material according to another embodiment.
Figure 15:
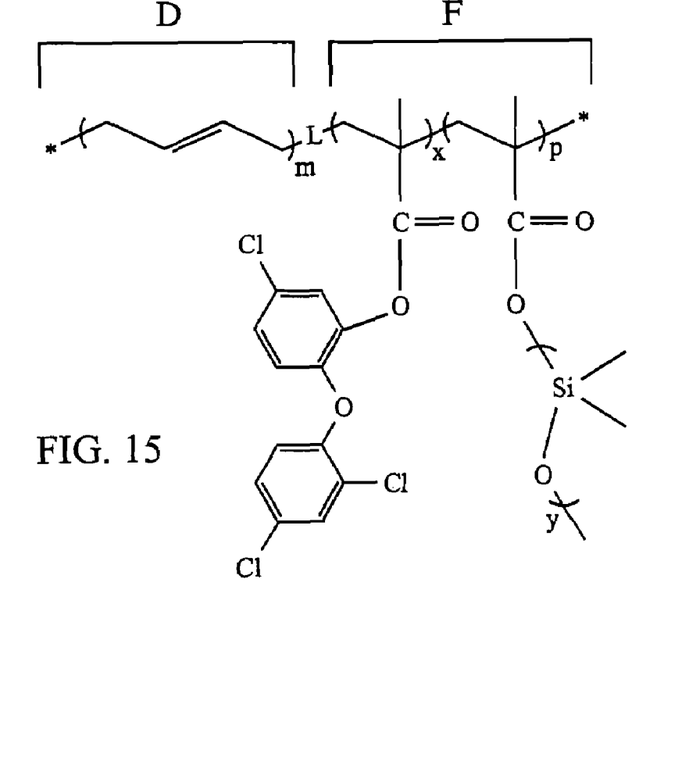
FIG. 15 shows an illustration of Polybutadiene-b-Poly-(TRICL-MAE)-co-polymethacrylate siloxane which may be used as an anti-fouling material according to another embodiment.
Figure 16:
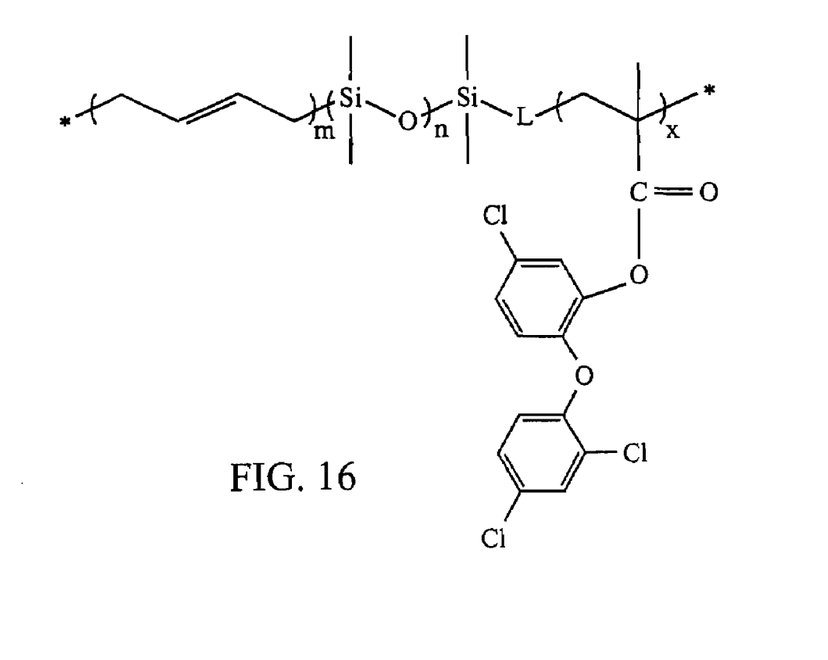
FIG. 16 shows an illustration of Polybutadiene-b-PDMS-b-Poly-(TRICL-MAE) which may be used as an anti-fouling material according to another embodiment.

FIGS. 11-16 show additional exemplary copolymers that may be used as anti-fouling materials. FIG. 11 shows Polyisoprene-b-PDMS-b-Polybiocide-co-polymethoxyethyl methacrylate. FIG. 12 shows Polyisoprene-b-PDMS-b-Polybiocide. FIG. 13 shows Polyisoprene-b-PDMS-b-Poly zinc acrylate-co-polymethoxyethyl methacrylate. The zinc atom shown in FIG. 13 may be coupled to any suitable ligand such as a Cl ion. FIG. 14 shows Polyisoprene-b-Polymethacrylate siloxane-co-polybiocide. FIG. 15 shows Polybutadiene-b-Polymethacrylate siloxane-co-polybiocide. FIG. 16 shows Polybutadiene-b-PDMS-b-Polybiocide.

In FIGS. 11 and 13-15, block F may be a block of random biocide blocks and textural blocks or may include ordered subblocks of biocide blocks and textural blocks. The use of the same base monomer (methacrylate) to polymerize the biocide blocks and textural blocks may provide for this type of arrangement of the blocks. Block D may be the rubbery block which provides additional strength and wear resistance to the copolymer. Block E may be another textural block which provides desirable foul release characteristics to the copolymer.

It should be understood that although many of the structures disclosed herein are made using methacrylate, a mixture of acrylate and methacrylate may also be used. Also, the combinations and ordering of the blocks in the block copolymers may be varied in a number of ways. For example, the structures described herein may be modified by removing or adding a polymer block to form an additional structure, by reordering the sequence of the blocks, or by including multiple blocks of the same or different polymers in any order.

Example 4

The structure shown below was prepared by adding undecenyl bromide (15 g, 52 mmol) to a solution of Triclosan (14.2 g, 61 mmol) and potassium carbonate (9 g, 61 mmol) in 100 ml of N,N-Dimethylformamide (DMF). The mixture was stirred at room temperature overnight. The solvent was removed by evaporation and the residue dissolved in 100 ml hexane and washed with water four times (4×100 ml). The organic layer was separated, dried with anhydrous MgSO$_4$, and evaporated to yield undecenyl funtionalized Triclosan as a colorless liquid.

The undecenyl functionalized Triclosan (18 g, 40 mmol) and Methacryloxy propyl polydimethyl siloxane (10 g, 10 mmol) were added to a solution of polymethyl hydrosiloxane (PMHS) (10 g, 5 mmol) in 100 ml of dry toluene. 2-3 drops of Karstedt's catalyst was added to the mixture. The reaction continued for 72 hours at 90° C. After the reaction, the mixture was passed through a neutral alumina column and the solvent was removed by evaporation to yield a colorless viscous material having the structure shown above where m=8, n=15, p=2, x=10 to 15, y=8, and q=3. The viscous material was crosslinked with divinyl terminated polydimethyl siloxane (Mn=700) with Karstedt's catalyst.

Example 5

The fouling rating was determined for a number of anti-fouling materials shown in graph 1 below. The fouling rating was determined using Designation: D 3623-78a (Reapproved 1998), Standard Test Method for Testing Antifouling Panels in Shallow Submergence, American Society for Testing and Materials, as described in the following. Each test surface which is free of fouling except for the presence of algal spores and other biological slimes receives a fouling rating of 100. The fouling rating is reduced to 95 if only incipient fouling is present. If mature forms of fouling are present, the fouling rating is obtained by subtracting from 95 the sum of the number of individuals present and the percent of the surface area covered by colonial forms.

Anti-fouling materials A-N, referenced in Graph 1, were tested to determine the fouling rating for each material. The reference material is a commercially available copper ablative coating. Material A is the crosslinked material prepared in Example 4 where m=8, n=15, p=2, x=10 t 15, y=8, and q=3. Material B is the crosslinked material prepared in Example 4 where m=8, n=24, p=0, and y=8. Material C is a commercially available anti-fouling coating sold under the tradename Interslick 425 available from International Paints UK. Material D is the crosslinked material VI from Table 1 (pgs 67-70) of U.S. Provisional Patent Application No. 60/506,077, entitled "Antifouling Materials," filed on Sep. 25, 2003 (hereinafter referred to as "crosslinked material VI") where n=5 and p=3. The crosslinked material VI is crosslinked using the cross linking agent shown in the adjacent column in Table 1 of the '077 patent application. Material E is crosslinked material VI where n=6 and p=2. Material F is the same as material A except that y=0. Material G is the same as material F except that n=8 and glycidyl ether was used as the cross linking agent. Material H is the same as material F except that n=8 and p=0. Material I is the same as material E except that the Triclosan is coupled to the siloxane backbone using an 11 carbon chain. Material J is crosslinked material VI where n=7 and p=1. Material K is crosslinked material VI where n=4 and p=4. Material L is the same as material E except that it is cross linked with 3-amino-1-(2,4,6,-trichlorophenyl)-2-pyrazolin-5-one. Material M is the same as material E except that Triclosan is linked to the polysiloxane using an acrylate rather than the propyl group. Material N is a mixture of material M and 10 wt. % free biocide (Triclosan).

The anti-fouling materials A-N, shown in Graph 1, were used to coat a substrate (metal) and placed in seawater (i.e., Indian River lagoon off the coast of Florida) for 80 days. The fouling rating for each coating was calculated as described above.

The terms recited in the claims should be given their ordinary and customary meaning as determined by reference to relevant entries in dictionaries, commonly understood meanings by those in the art, etc., with the understanding that the broadest meaning imparted by any one or combination of these sources should be given to the claim terms subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "as used herein," "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the claims are not tied and should not be interpreted to be tied to any particular embodiment, feature, or combination of features other than those explicitly recited in the claims, even if only a single embodiment of the particular feature or combination of features is illustrated and described herein. Thus, the appended claims should be read to be given their broadest interpretation in view of the prior art and the ordinary meaning of the claim terms.

As used herein (i.e., in the claims and the specification), articles such as "the," "a," and "an" can connote the singular or plural. Also, as used herein, the word "or" when used without a preceding "either" (or similar language indicating that "or" is meant to be exclusive; e.g., one of x or y, etc.) shall be interpreted to be inclusive, that is "or" when it appears alone shall mean both "and" and "or." Likewise, as used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A block copolymer having a formula:

wherein m is an integer from 0 to 100;
n is an integer from 0 to 100;
at least one of m and n≠0;
In is an initiator group selected from the group consisting of hydrogen, $C_1$-$C_4$ alkyl, and trimethyl silyl;
a is 0 or 1;
b is 0 or 1;
x is an integer from 1 to 200;
p is an integer from 0 to 75;
$R^1$ is hydrogen or methyl;
$R^2$ and $R^3$ are independently a cross-linking group, $C_1$-$C_{10}$ alkyl, cyclopentyl, cyclohexyl, benzyl, toluyl, xylyl, or phenyl, wherein the cross-linking group is selected from the group consisting of epoxy, olefin, amine, aldehyde, and ester;
$L^1$ is a linking group selected from the group consisting of $C_3$-$C_{23}$ alkylene,

$R^4$ is a biocidal group that is toxic to organisms that cause fouling in an aquatic environment or a group that can be cleaved to provide a biocidal group;

R[5] is a polyether group, a perfluoroalkyl group, a polysiloxane group, a deuterobenzene group, an alkyl group, or other texturizing group;

R[x] is hydrogen or methyl; and

EC is selected from the group consisting of hydrogen, $C_1$-$C_4$ alkyl, and trimethyl silyl.

2. The copolymer of claim 1 wherein R[4] is:

wherein c is 0 or 1 and the alkylene has 2 to 20 carbon atoms.

3. The copolymer of claim 1 wherein L[1] is:

wherein R[6] and R[7] are independently hydrogen or methyl.

4. The copolymer of claim 1 wherein R[5] is a block or random polymeric unit having a formula represented by:

wherein d is an integer from 1 to 100;
z is an integer from 0 to 50;
v is an integer from 0 to 50.

5. The copolymer of claim 1 wherein R[2] and R[3] are methyl.

6. The copolymer of claim 1 wherein R[5] is methoxyethyl; and p is an integer from 1 to 75.

7. The copolymer of claim 1 wherein n is 0; and b is 0.

8. The copolymer of claim 1 wherein m is 0.

9. A biocidal composition comprising the copolymer of claim 1.

10. A copolymer having a formula:

wherein n is an integer from 1 to 1,000:
m is an integer from 2 to 1,000;
R[1], R[2] and R[3] are independently a $C_1$-$C_{10}$ alkyl, a cyclopentyl, a cyclohexyl, a benzyl, a toluyl, a xylyl or a phenyl;

R[4] and R[14] are independently a hydrogen, a $C_1$-$C_{10}$ alkyl, a cyclopentyl, a cyclohexyl, a benzyl, a toluyl, a xylyl or a phenyl;

R[5] is a $C_1$-$C_{10}$ alkyl, a cyclopentyl, a cyclohexyl, a benzyl, a toluyl, a xylyl, a phenyl, a cross-linking group selected from the group consisting of epoxy, olefin, amine, aldehyde, and ester, a biocidal group that is toxic to organisms that cause fouling in an aquatic environment, a polyether group, a perfluoroalkyl group, a polysiloxane group, or a deuterobenzene group; and R[15] is a biocidal group that is toxic to organisms that cause fouling in an aquatic environment;

wherein the R[5] and R[15] biocidal groups are bound to the silicone backbone by a non-hydrolysable linkage.

11. The copolymer of claim 10 wherein said copolymer is a random copolymer.

12. The copolymer of claim 10 wherein the copolymer has a formula:

wherein m is an integer between 1 to 15;
n is an integer between 2 to 50;
p is an integer between 0 to 10;
x is an integer between 5 to 25;
y is an integer between 0 to 20;
q is an integer between 2 to 15; and
* is selected from the group consisting of hydrogen, $C_1$-$C_4$ alkyl, and trimethyl silyl.

13. A biocidal composition comprising the copolymer of claim 10.

14. A copolymer having a formula:

wherein m is an integer from 0 to 100;
n is an integer from 0 to 100;
at least one of m and n≠0;
y is an integer from 1 to 100;
x is an integer from 1 to 200;

In is an initiator group selected from the group consisting of hydrogen, $C_1$-$C_4$ alkyl, and trimethyl silyl;

EC is selected from the group consisting of hydrogen, $C_1$-$C_4$ alkyl, and trimethyl silyl;

$R^1$ is hydrogen or methyl;

$R^2$ is $C_1$-$C_{10}$ alkyl, cyclopentyl, cyclohexyl, benzyl, toluyl, xylyl, or phenyl;

$L^1$ is a linking group selected from the group consisting of $C_3$-$C_{23}$ alkylene, $R^3$ is a biocidal group that is toxic to organisms that cause fouling in an aquatic environment or a group that can be cleaved off to provide such a biocidal group;

$R^4$ and $R^5$ are independently a cross-linking group, $C_1$-$C_{10}$ alkyl, cyclopentyl, cyclohexyl, benzyl, toluyl, xylyl, phenyl, or a biocidal functional group, wherein the cross-linking group is selected from the group consisting of epoxy, olefin, amine, aldehyde, and ester; and $R^x$ is hydrogen or methyl.

15. The copolymer of claim 14 wherein $R^2$ is methyl;

$R^4$ is methyl; and $R^5$ is methyl.

16. The copolymer of claim 14 wherein n is 0.

17. The copolymer of claim 14 wherein m is 0.

18. A biocidal composition comprising the copolymer of claim 14.

19. The copolymer of claim 1, wherein the $C_1$-$C_4$ alkyl is selected from the group consisting of methyl or n-butyl.

20. The copolymer of claim 10, wherein the $R^5$ and $R^{15}$ biocidal groups are bound to the silicone backbone by a $C_3$-$C_{23}$ alkylene, perfluoroalkyl, ether, polyether, phenyl, aryl, heterocyclic, polyaromatic, polypeptide, polysiloxane, polyamide, polysulfone, or polyurethane group.

* * * * *